(12) United States Patent
Song et al.

(10) Patent No.: US 8,508,067 B2
(45) Date of Patent: Aug. 13, 2013

(54) MOTOR DRIVE SYSTEM FOR HYBRID VEHICLE AND METHOD FOR CONTROLLING THE SAME IN THE EVENT OF FAILURE

(75) Inventors: Hong Seok Song, Gyeonggi-do (KR); Ki Jong Lee, Gyeonggi-do (KR); Ki Young Jang, Gyeonggi-do (KR); Shin Hye Chun, Gyeonggi-do (KR); Won Kyoung Choi, Gyeonggi-do (KR); Hyong Joon Park, Gyeonggi-do (KR); Jin Hwan Jung, Gyeonggi-do (KR); Jung Hong Joo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 397 days.

(21) Appl. No.: 12/796,761

(22) Filed: Jun. 9, 2010

(65) Prior Publication Data

US 2011/0133547 A1 Jun. 9, 2011

(30) Foreign Application Priority Data

Dec. 3, 2009 (KR) .......................... 10-2009-0118798

(51) Int. Cl.
*B60L 1/00* (2006.01)
(52) U.S. Cl.
USPC .......................................... 307/9.1; 307/10.1
(58) Field of Classification Search
USPC ................................................. 307/9.1, 10.1
See application file for complete search history.

(56) References Cited

U.S. PATENT DOCUMENTS

| | | | | |
|---|---|---|---|---|
| 5,796,175 | A * | 8/1998 | Itoh et al. | 307/10.1 |
| 6,608,396 | B2 * | 8/2003 | Downer et al. | 290/40 C |
| 7,269,535 | B2 * | 9/2007 | Kishimoto | 702/183 |
| 7,584,813 | B2 * | 9/2009 | Yoshida | 180/65.29 |
| RE41,303 | E * | 5/2010 | Komatsu et al. | 318/700 |
| 7,835,831 | B2 * | 11/2010 | Chung et al. | 701/22 |
| 7,857,081 | B2 * | 12/2010 | Kishimoto | 180/65.27 |
| 8,111,026 | B2 * | 2/2012 | Kitano | 318/139 |
| 2003/0081440 | A1* | 5/2003 | Komatsu et al. | 363/132 |
| 2003/0140880 | A1* | 7/2003 | Kahlon et al. | 123/179.3 |
| 2004/0164703 | A1* | 8/2004 | Berels | 320/103 |
| 2006/0224360 | A1* | 10/2006 | Kishimoto | 702/183 |
| 2010/0006360 | A1* | 1/2010 | Kishimoto | 180/65.285 |
| 2011/0087395 | A1* | 4/2011 | Yamamoto et al. | 701/22 |
| 2012/0055727 | A1* | 3/2012 | Omiya et al. | 180/279 |

FOREIGN PATENT DOCUMENTS

| | | |
|---|---|---|
| JP | 2005-143259 A | 6/2005 |
| JP | 2007-252134 A | 9/2007 |
| JP | 2008-312306 A | 12/2008 |

* cited by examiner

*Primary Examiner* — Adi Amrany
(74) *Attorney, Agent, or Firm* — Edwards Wildman Palmer LLP; Peter F. Corless

(57) ABSTRACT

The present invention provides a motor drive system for a hybrid vehicle and a method for controlling the same in the event of a failure in a voltage converter, in which high voltage stored in a DC-link capacitor is discharged to a 12V electrical load through a DC-DC converter, of which the output voltage is increased.

2 Claims, 6 Drawing Sheets MOTOR DRIVE SYSTEM FOR HYBRID VEHICLE AND METHOD FOR CONTROLLING THE SAME IN THE EVENT OF FAILURE

CROSS-REFERENCE TO RELATED APPLICATION

This application claims under 35 U.S.C. §119(a) the benefit of Korean Patent Application No. 10-2009-0118798 filed Dec. 3, 2009, the entire contents of which are incorporated herein by reference.

BACKGROUND (a) Technical Field

The present disclosure relates, generally, to a motor drive system for a hybrid vehicle and a method for controlling the same. More particularly, it relates to a motor drive system for a hybrid vehicle and a method for controlling the same in the event of a failure in a voltage converter, in which high voltage stored in a DC-link capacitor is suitably discharged to a 12V electrical load through a DC-DC converter, of which the output voltage is increased.

(b) Background Art

Hybrid vehicles are the vehicles of the future that employ an electric motor as an auxiliary power source as well as a gasoline engine to provide a reduction in exhaust gas and an improvement in fuel efficiency.

When the engine operates in an inefficient state, the electric motor is driven by the power of a battery to increase the efficiency of a hybrid system (load leveling). Moreover, the battery is charged by regenerative braking during deceleration, in which the kinetic energy, which would be dissipated as frictional heat in a brake system, is converted into electrical energy by the power generation of the motor, thereby suitably improving the fuel efficiency.

Hybrid vehicles are divided into soft type hybrid vehicles and hard type hybrid vehicles based on whether or not the motor is connected and driven in a power transmission system.

An exemplary motor drive system for an existing hard type hybrid vehicle is shown in FIG. 6. As shown in FIG. 6, the motor drive system preferably includes first and second motors M1 and M2 for driving the vehicle, first and second inverters 1 and 2 for driving the first and second motors M1 and M2, respectively, a DC battery B for outputting a DC voltage, a voltage converter 3 for boosting the DC voltage from the DC battery B and suitably supplying the resulting voltage to the first and second inverters 1 and 2 or for lowering the DC voltage from the first and second inverters 1 and 2 and suitably supplying the resulting voltage to the DC battery B, relay(s) SR1 and SR2 connected between the DC battery B and the voltage converter 3, and a DC-DC converter 4 as an electrical load or power supply device suitably connected between the relay(s) SR1 and SR2 and the voltage converter 3.

The DC-DC converter 4 is commonly called a power converter in which the energy flow is unidirectional or bidirectional. Reference numerals 5, 6 and 7 denote a 12V auxiliary battery, a 12V electrical load, and a DC-link capacitor, respectively.

In the motor drive system for a conventional hybrid vehicle, in the event of a failure in the voltage converter 3, it can take several minutes to hours for the high voltage stored in the DC-link capacitor 7 mounted between the first and second inverters 1 and 2 to be naturally discharged due to the absence of a discharge path, and as a result a repairman may get an electric shock during repair, and a driver or rescuer may get an electric shock in the event of a vehicle accident.

Meanwhile, the voltage supplied from the DC battery B to a DC-DC-DC converter, i.e., the DC-DC converter 4, which is represented as an electrical load, is DC power, and the voltage of the DC battery B is changed according to the state of charge (SOC) of the battery and the amount of energy charged into and discharged from the battery. Accordingly, the DC-DC converter should preferably be configured to cope with the change in battery voltage.

For example, when the voltage of the DC battery B is changed from 200 V to 400 V, while the input current of the DC-DC converter 4 for producing a power of 2 kW is about 5 A at the battery voltage of 400 V, it should be about 10 A at the battery voltage of 200 V. Accordingly, the DC-DC converter is designed based on the current required at the minimum battery voltage, which results in an increase in capacity.

As a result, it is necessary to use a high capacity battery to suitably reduce the change in battery voltage or to minimize the change in SOC of the battery by reducing the amount of energy charged into and discharged from the battery. However, using these two methods may result in an increase in the cost of materials and deterioration in fuel efficiency.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a motor drive system for a hybrid vehicle and a method for controlling the same, in which a DC-DC converter is suitably connected between a voltage converter and first and second inverters such that in the event of a failure in the voltage converter, relay(s) are turned off and, at the same time, high voltage stored in a DC-link capacitor is suitably discharged to a 12V electrical load through a DC-DC converter, of which the output voltage is increased.

In preferred embodiments, the present invention provides a motor drive system for a hybrid vehicle and a method for controlling the same in the event of a failure in both a voltage converter and a DC-DC converter, in which high voltage stored in a DC-link capacitor suitably mounted between first and second inverters is effectively discharged through a resistance component of a motor by suitably switching control of the first and second inverters.

In one preferred embodiment, the present invention provides a motor drive system for a hybrid vehicle, the system preferably including first and second motors for driving the vehicle; first and second inverters for driving the first and second motors, respectively; a DC battery for outputting a DC voltage; a voltage converter for suitably boosting or lowering the DC voltage from the DC battery and supplying the resulting voltage to the first and second inverters or for boosting or lowering the DC voltage from the first and second inverters and suitably supplying the resulting voltage to the DC battery; relay(s) connected between the DC battery and the voltage converter; a DC-DC converter connected between the voltage converter and the first and second inverters and discharging high voltage of a DC-link capacitor, and an electrical load driven by a 12V auxiliary battery connected to the DC-DC converter.

In another preferred embodiment, the present invention provides a method for controlling a motor drive system for a hybrid vehicle in the event of a failure in a voltage converter, the method preferably including turning off relay(s); increasing output voltage of a DC-DC converter; turning on a specific electrical load; and allowing high voltage stored in a DC-link capacitor to be suitably discharged to the specific electrical load through the DC-DC converter.

In still another preferred embodiment, the present invention provides a method for controlling a motor drive system for a hybrid vehicle in the event of a failure in both a voltage converter and a DC-DC converter, the method preferably comprising turning off relay(s); performing switching control of first and second inverters; and allowing high voltage stored in a DC-link capacitor to be suitably discharged to first and second motors.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
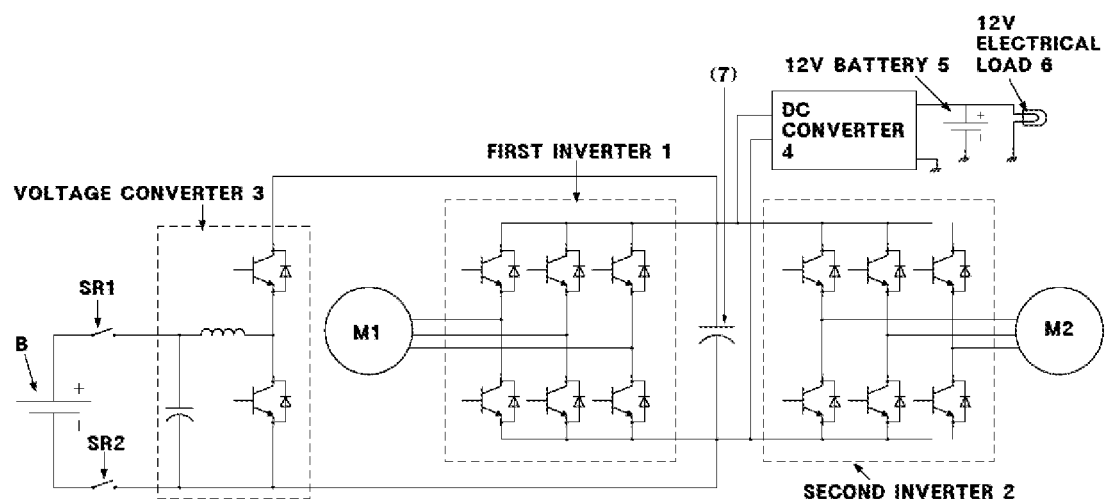
FIG. 1 is a schematic diagram of a motor drive system for a hybrid vehicle in accordance with exemplary embodiments of the present invention.

Reference numerals set forth in the Drawings includes reference to the following elements as further discussed below:

| 1: | first inverter |
|---|---|
| 2: | second inverter |
| 3: | voltage converter |
| 4: | DC-DC converter |
| 5: | 12 V battery |
| 6: | electrical load |
| 7. | DC-link capacitor |
| M1: | first motor |
| M2: | second motor |
| B: | DC battery |
| SR1: | first relay |
| SR2: | second relay |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

According to a first aspect, the present invention features a motor drive system for a hybrid vehicle, the system comprising first and second motors for driving the vehicle, first and second inverters for driving the first and second motors, a DC battery for outputting a DC voltage, a voltage converter, relay (s) connected between the DC battery and the voltage converter, a DC-DC converter, and an electrical load.

In one embodiment, the voltage converter is used for boosting or lowering the DC voltage from the DC battery and supplying the resulting voltage to the first and second inverters or for boosting or lowering the DC voltage from the first and second inverters and supplying the resulting voltage to the DC battery.

In another embodiment, the DC-DC converter is connected between the voltage converter and the first and second inverters and discharges high voltage of a DC-link capacitor.

In another further embodiment, the electrical load is driven by a 12V auxiliary battery connected to the DC-DC converter.

In another aspect, the present invention features a method for controlling a motor drive system for a hybrid vehicle in the event of a failure in a voltage converter, the method comprising turning off relay(s), increasing output voltage of a DC-DC converter, turning on (a) specific electrical load(s), and allowing high voltage stored in a DC-link capacitor to be discharged to the specific electrical load through the DC-DC converter.

In still another aspect, the present invention features a method for controlling a motor drive system for a hybrid vehicle in the event of a failure in both a voltage converter and a DC-DC converter, the method comprising turning off relay (s), performing switching control of first and second inverters, and allowing high voltage stored in a DC-link capacitor to be discharged to first and second motors.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a schematic diagram of a motor drive system for a hybrid vehicle in accordance with an exemplary embodiment of the present invention.

Preferably, first and second inverters 1 and 2 as powertrain components are suitably connected to first and second motors M1 and M2 for driving the vehicle, respectively, through a DC battery B for outputting a DC voltage and a voltage converter 3.

According to further preferred embodiments, the voltage converter 3 boosts or lowers the DC voltage from the DC battery B and suitably supplies the resulting voltage to the first and second inverters 1 and 2 or boosts or lowers the DC voltage from the first and second inverters 1 and 2 and suitably supplies the resulting voltage to the DC battery B.

In further preferred embodiments, relay(s) SR1 and SR2 for supplying or cutting off the power of the DC battery B are suitably disposed between the DC battery B and the voltage converter 3.

Preferably, a DC-DC converter 4 as a non-powertrain component is suitably connected between the voltage converter 3 and the first and second inverters 1 and 2.

In further preferred embodiments, the motor drive system of the present invention preferably includes a controller (not shown) which suitably controls the relay(s) SR1 and SR2 to be turned off and controls the DC-DC converter 4 such that the high voltage energy stored in a DC-link capacitor 7 is suitably discharged in response to a failure detection signal in the event of a failure in the voltage converter 3.

Preferably, in further exemplary embodiments, a 12V electrical load 6 (such, but not limited to, as rear window defroster wire, water pump, oil pump, radiator cooling fan, etc.) driven by the power of a 12V auxiliary battery 5 is suitably connected to the DC-DC converter 4 and controlled by the controller.

Next, a method for controlling the above-described motor drive system for the hybrid vehicle in the event of a failure in accordance with preferred exemplary embodiments of the present invention is described with reference to FIGS. 2 and 3.

Figure 2:
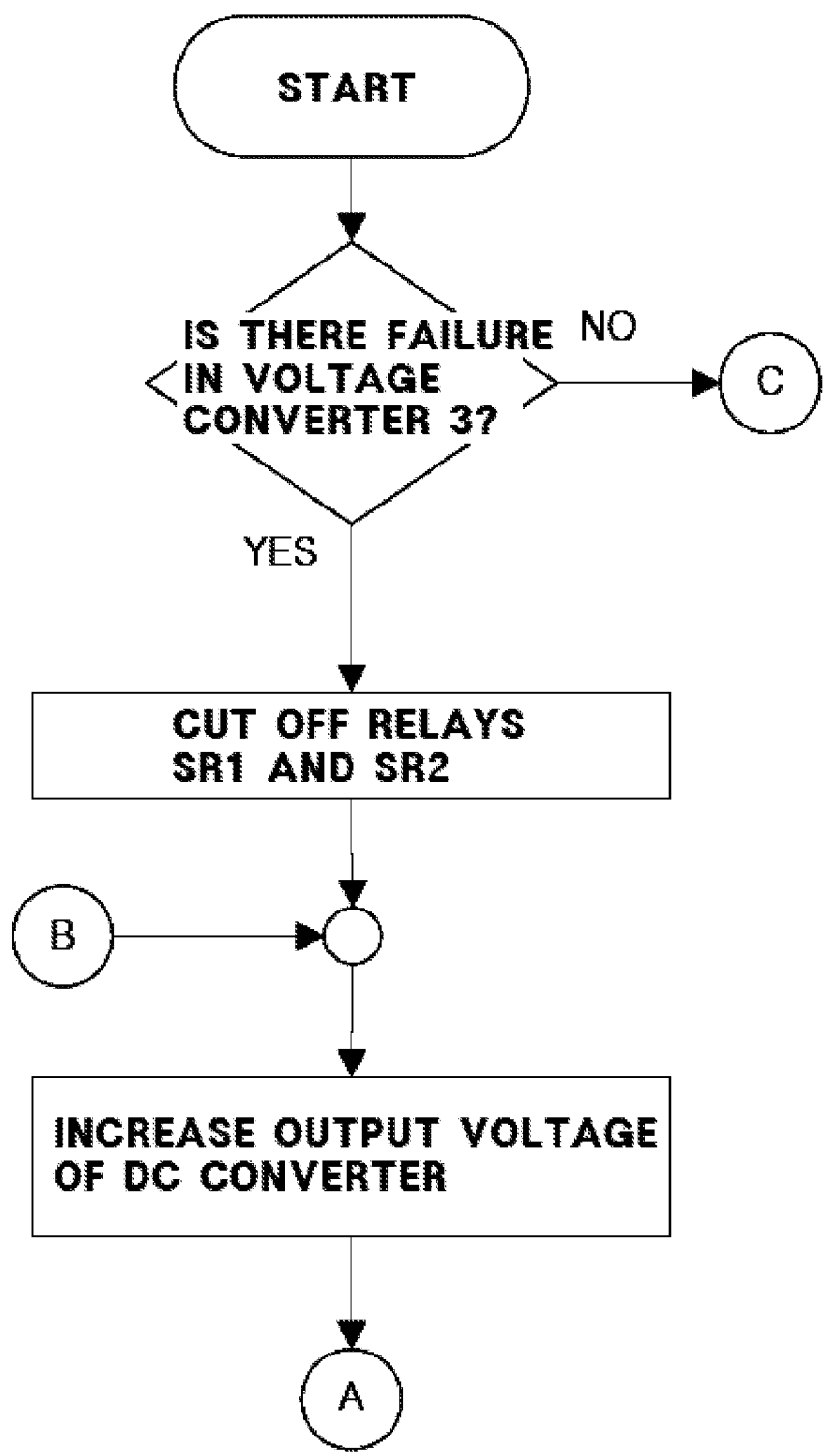
FIGS. 2 and 3 are flowcharts illustrating a method for controlling a motor drive system for a hybrid vehicle in the event of a failure in a voltage converter in accordance with other exemplary embodiments of the present invention.
Figure 3:
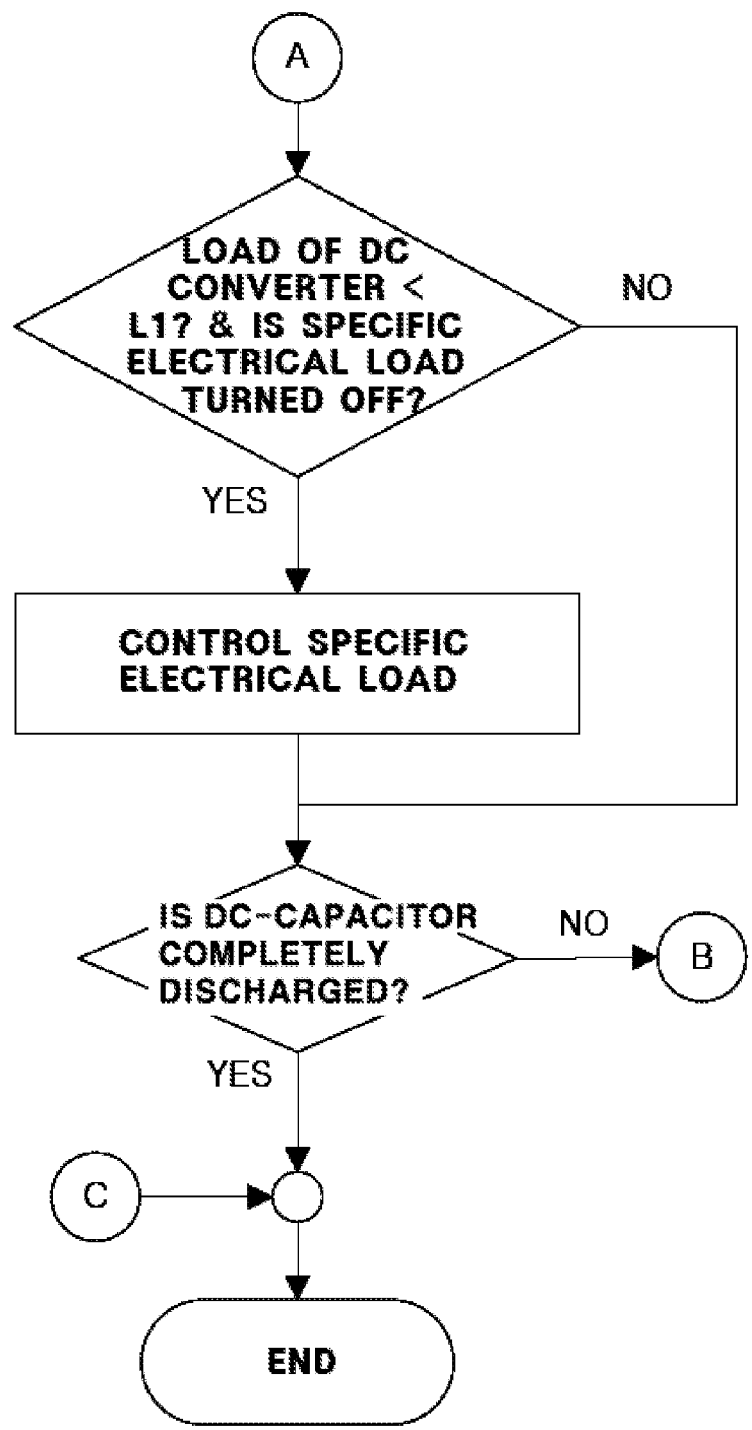

According to certain preferred embodiments and as shown in FIGS. 2 and 3, for example, FIGS. 2 and 3 are flowcharts illustrating a method for controlling a motor drive system for a hybrid vehicle in the event of a failure in a voltage converter in accordance with preferred exemplary embodiments of the present invention.

According to exemplary embodiments of the present invention, in the event of a failure of the voltage converter 3, the relay(s) SR1 and SR2 are turned off and, at the same time, the high voltage stored in the DC-link capacitor 7 is suitably discharged to the 12V electrical load 6 through the DC-DC converter 4, of which the output voltage is increased.

According to certain exemplary embodiments, and for a better understanding of the present invention, the boundary of discharge amount of the DC-link capacitor 7 is referred to as L1, and a certain 12V electrical load 6 such as the rear window defroster wire, which can be controlled by the controller, is referred to as a specific electrical load.

Preferably, when the power consumption of the DC-DC converter 4 is less than L1, the 12V auxiliary battery 5 is fully charged. Accordingly, at this time, an additional specific electrical load is turned on or off to increase the power consumption of the 12V electrical load, thereby suitably increasing the power consumption of the DC-DC converter 4.

In further preferred embodiments, if the load of the DC-DC converter 4 is smaller than L1 as the boundary of discharge amount of the DC-link capacitor 7 and, at the same time, if the specific electrical load is turned off, the controller preferably controls the specific electrical load to be turned on and, at the same time, controls the DC-DC converter 4 to suitably increase the output voltage such that the high voltage stored in the DC-link capacitor 7 is suitably discharged to the specific electrical load through the DC-DC converter 4.

Preferably, in certain exemplary embodiments, the specific electrical load is an electrical device which is not recognized by a user or with which the user is not dissatisfied even though he or she recognizes the electrical device. In further exemplary embodiments, the specific electrical loads which can not be recognized by the user may include, but are not limited to, for example, a water pump, an oil pump, a radiator cooling fan, a wiper deicer, an air cleaner, a high voltage battery cooling fan, etc. Preferably, the specific electrical loads which can be recognized (wanted) by the user may include, but are not limited to, for example, a heater and seat hot wire, which are used at low room temperature, and headlights, an audio system, fog lamps, etc.

Further, when a boost converter is suitably employed as the voltage converter 3, the voltage of the DC-link capacitor 7 is equal to or greater than that of the DC battery B. Accordingly, in certain preferred embodiments, when the relay(s) SR1 and SR2 are turned on, it is impossible to control the voltage of the DC-link capacitor 7 to be lower than the voltage of the DC battery B. On the contrary, when the relay(s) SR1 and SR2 are turned off, the DC battery B as an energy storage is electrically disconnected from the voltage converter 3, and thus the electrical energy of the DC-link capacitor 7 can not be suitably transferred to the DC battery B.

Accordingly, after the relay(s) SR1 and SR2 are suitably turned off, the voltage converter 3 is turned off and, at the same time, the DC-DC converter 4 is controlled to increase the output voltage, thus charging the 12V auxiliary battery 5 or supplying electrical energy to a certain specific electrical load. Thus, according to certain preferred embodiments, it is possible to suitably control the voltage of the DC-link capacitor 7 to be lower than a predetermined voltage without consuming the high voltage energy of the DC-link capacitor 7 by discharging.

Accordingly, in preferred embodiments of the present invention, if the power consumption of the DC-DC converter 4 is less than L1, the 12V auxiliary battery 5 is fully charged and, in the event of a collision accident, it is necessary to reduce the voltage of the DC-link capacitor 7 within a short time in order to prevent a driver or rescuer from getting an electric shock.

Therefore, after the relay(s) SR1 and SR2 are turned off, the DC-DC converter 4 is suitably controlled to increase the output voltage, and a high capacity 12V electrical load (e.g., headlights, rear window defroster wire, etc.) is forcibly turned on to immediately increase the power consumption of the 12V electrical load and the DC-DC converter 4. As a result, the high voltage energy stored in the DC-link capacitor 7 is suitably discharged to the specific electrical load through the DC-DC converter 4.

As such, according to another further preferred exemplary embodiment of the present invention, in the event of a failure in the voltage converter 3, the relay(s) SR1 and SR2 are suitably turned off and, at the same time, the high voltage stored in the DC-link capacitor 7 is suitably discharged to a specific electrical load through the DC-DC converter 4, of which the output voltage is increased, thereby preventing the driver or rescuer from getting an electric shock. Moreover, since it is not necessary to increase the capacity of the high voltage battery as the existing DC battery B, it is possible to reduce the cost of materials.

Figure 4:
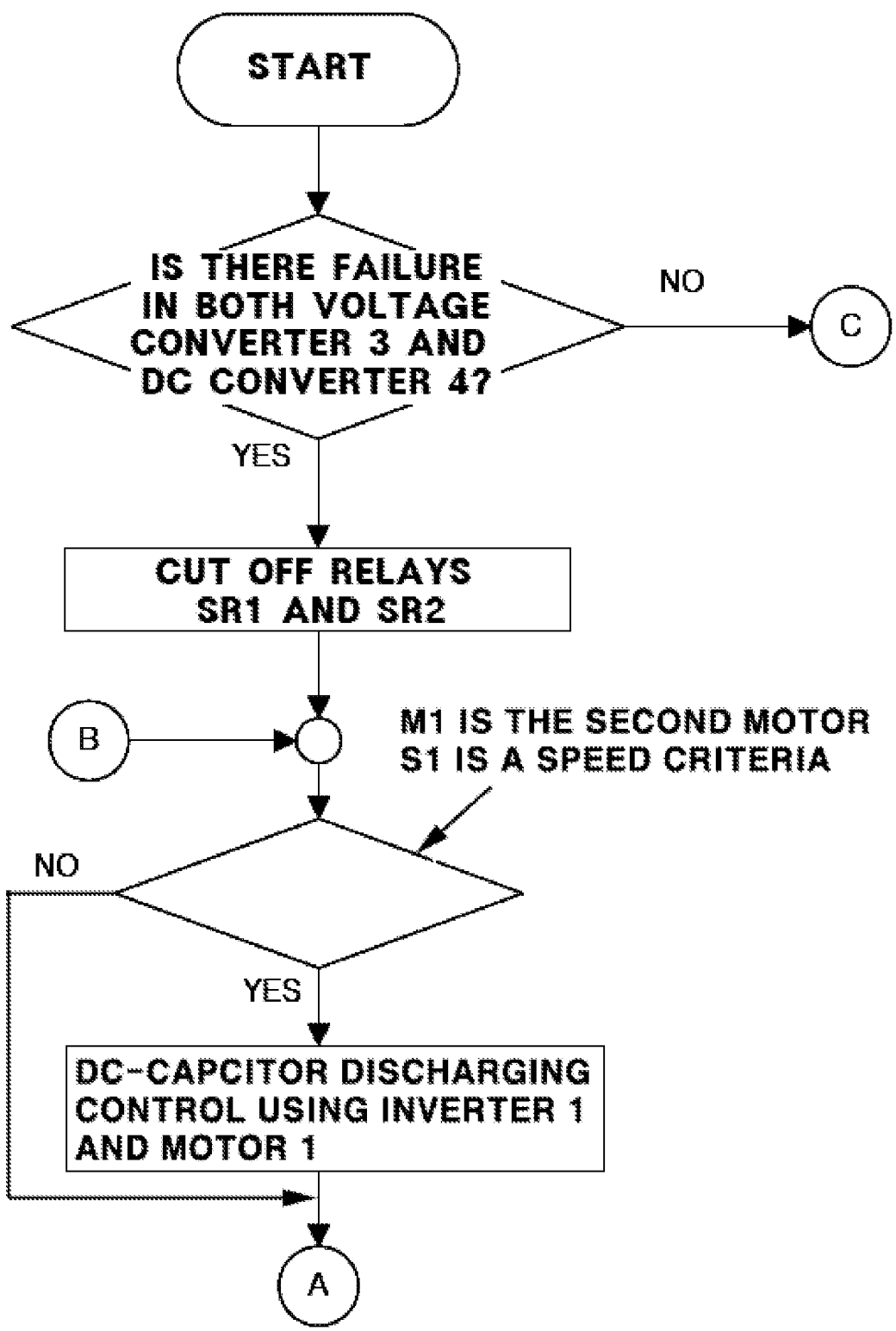
FIGS. 4 and 5 are flowcharts illustrating a method for controlling a motor drive system for a hybrid vehicle in the event of a failure in both a voltage converter and a DC-DC converter in accordance with further exemplary embodiments of the present invention.
Figure 5:
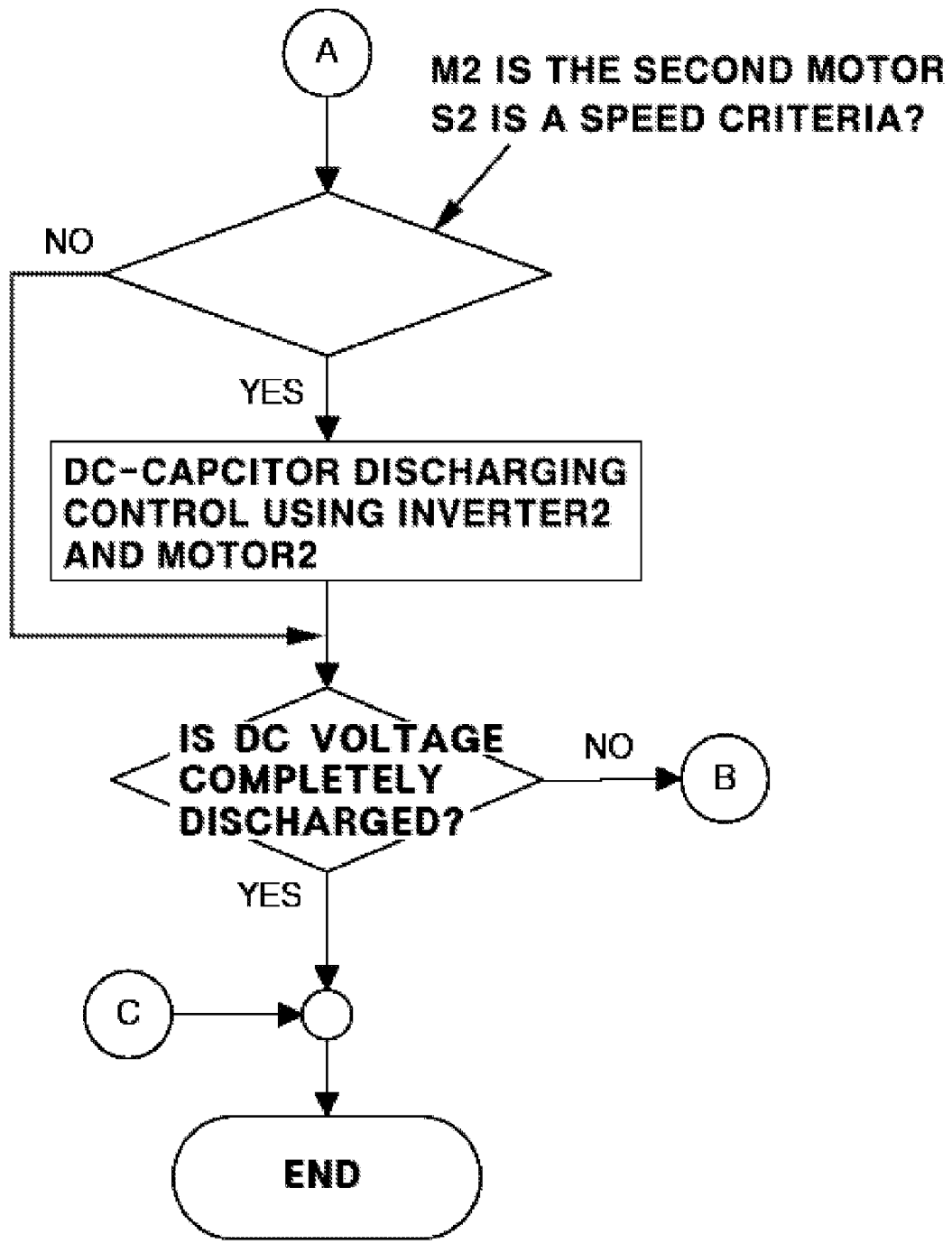
Figure 6:
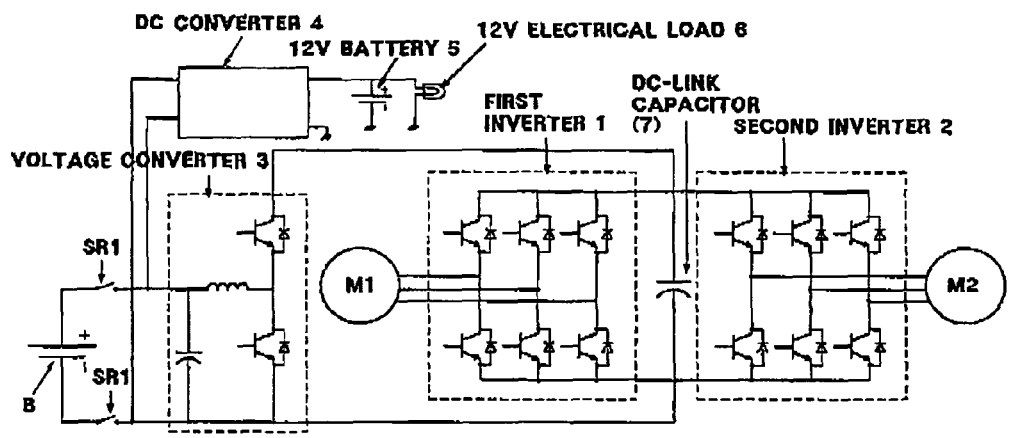
FIG. 6 is a schematic diagram of a motor drive system for a conventional hybrid system.

According to further preferred embodiments and as shown in FIGS. 4 and 5, FIGS. 4 and 5 are flowcharts illustrating a method for controlling a motor drive system for a hybrid vehicle in the event of a failure.

According to still another exemplary embodiment of the present invention, in the event of a failure in both the voltage converter 3 and the DC-DC converter 4, the relay(s) SR1 and SR2 are preferably turned off, and the high voltage stored in the DC-link capacitor 7 mounted between the first and second inverters 1 and 2 is suitably discharged through a resistance component of a motor by switching control of the first and second inverters 1 and 2.

In further related embodiments, in the event of a failure in both the voltage converter 3 and the DC-DC converter 4, the relay(s) SR1 and SR2 are turned off, and the high voltage stored in the DC-link capacitor 7 is suitably discharged to first and second motors M1 and M2 by the switching control of the first and second inverters 1 and 2. Preferably, in further preferred embodiments, at this time, the speed of the first and second motors M1 and M2 is suitably controlled to be lower than S1 and S2 as limit values of the motor speed for discharge control such that the high voltage energy stored in the DC-link capacitor 7 is discharged through the resistance component of the motors.

In further preferred embodiments, if the speed of the first and second motors M1 and M2 is suitably controlled to be higher than S1 and S2 as the limit values of the motor speed for discharge control, the voltage of the DC-link capacitor 7 may be suitably increased. Accordingly, it is preferred that the speed of the first and second motors M1 and M2 is suitably controlled to be lower than S1 and S2.

According to this exemplary embodiment of the present invention, in the event of a failure in both the voltage converter 3 and the DC-DC converter 4, the relay(s) SR1 and SR2 are turned off and, at the same time, the high voltage stored in the DC-link capacitor 7 is suitably discharged through the resistance components of the first and second motors M1 and M2, thereby preventing the driver or rescuer from getting an electric shock. Further, since it is not necessary to suitably increase the capacity of the high voltage battery as the existing DC battery B, it is possible to suitably reduce the cost of materials.

As described above, in certain preferred embodiments, the present invention provides the following effects.

According to the present invention, the DC-DC converter is suitably connected between the voltage converter and the first and second inverters such that in the event of a failure in the voltage converter, the relay(s) are suitably turned off and, at the same time, the high voltage stored in the DC-link capacitor is suitably discharged to the 12V electrical load through the DC-DC converter, of which the output voltage is increased, or in the event of a failure in both the voltage converter and the DC-DC converter, the relay(s) are turned off and, at the same time, the high voltage stored in the DC-link capacitor is suitably discharged through the resistance components of the first and second motors, thereby preventing the driver or rescuer from getting an electric shock. Further, in preferred embodiments of the present invention, since it is not necessary to increase the capacity of the high voltage battery as the existing DC battery B, it is possible to suitably reduce the cost of materials.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A motor drive system for a hybrid vehicle, the system comprising:
   first and second motors that drive the vehicle;
   first and second inverters connected to the first and second motors, respectively, to drive the first and second motors, respectively;
   a DC battery outputting a DC voltage;
   a voltage converter selectively boosting or lowering the DC voltage from the DC battery and supplying the resulting voltage to the first and second inverters, selectively boosting or lowering the DC voltage from the first and second inverters, and supplying the resulting voltage to the DC battery;
   relay(s) connected between the DC battery and the voltage converter;
   a DC-DC converter connected between the first and second inverters to discharge a high voltage of a DC-link capacitor that is connected between the voltage converter and the first and second inverters; and
   an electrical load connected directly to the DC-DC converter, the electrical load being driven by a 12V auxiliary battery.

2. The system of claim 1, further comprising a controller for controlling the relay(s) to be turned off and controlling the DC-DC converter such that the high voltage stored in the DC-link capacitor is discharged in response to a failure detection signal in the event of a failure in the voltage converter or/and inverters.

* * * * *